Sept. 4, 1951  J. D. ANDREWS  2,566,396
SKID CHAIN APPLIER AND REMOVER
Filed May 26, 1949  2 Sheets-Sheet 1
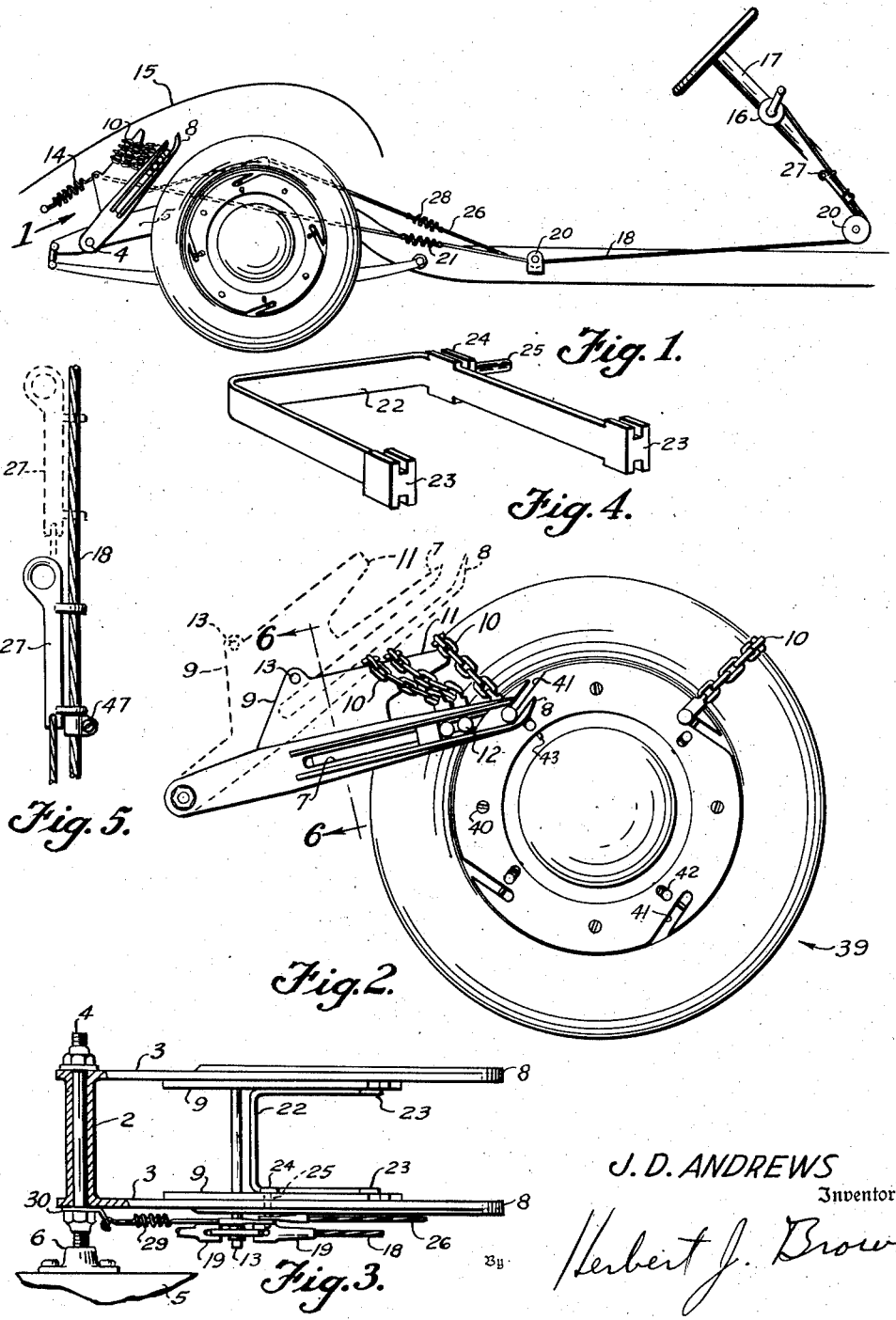
J. D. ANDREWS
Inventor
Herbert J. Brown
By
Attorney Sept. 4, 1951     J. D. ANDREWS     2,566,396
SKID CHAIN APPLIER AND REMOVER
Filed May 26, 1949     2 Sheets-Sheet 2
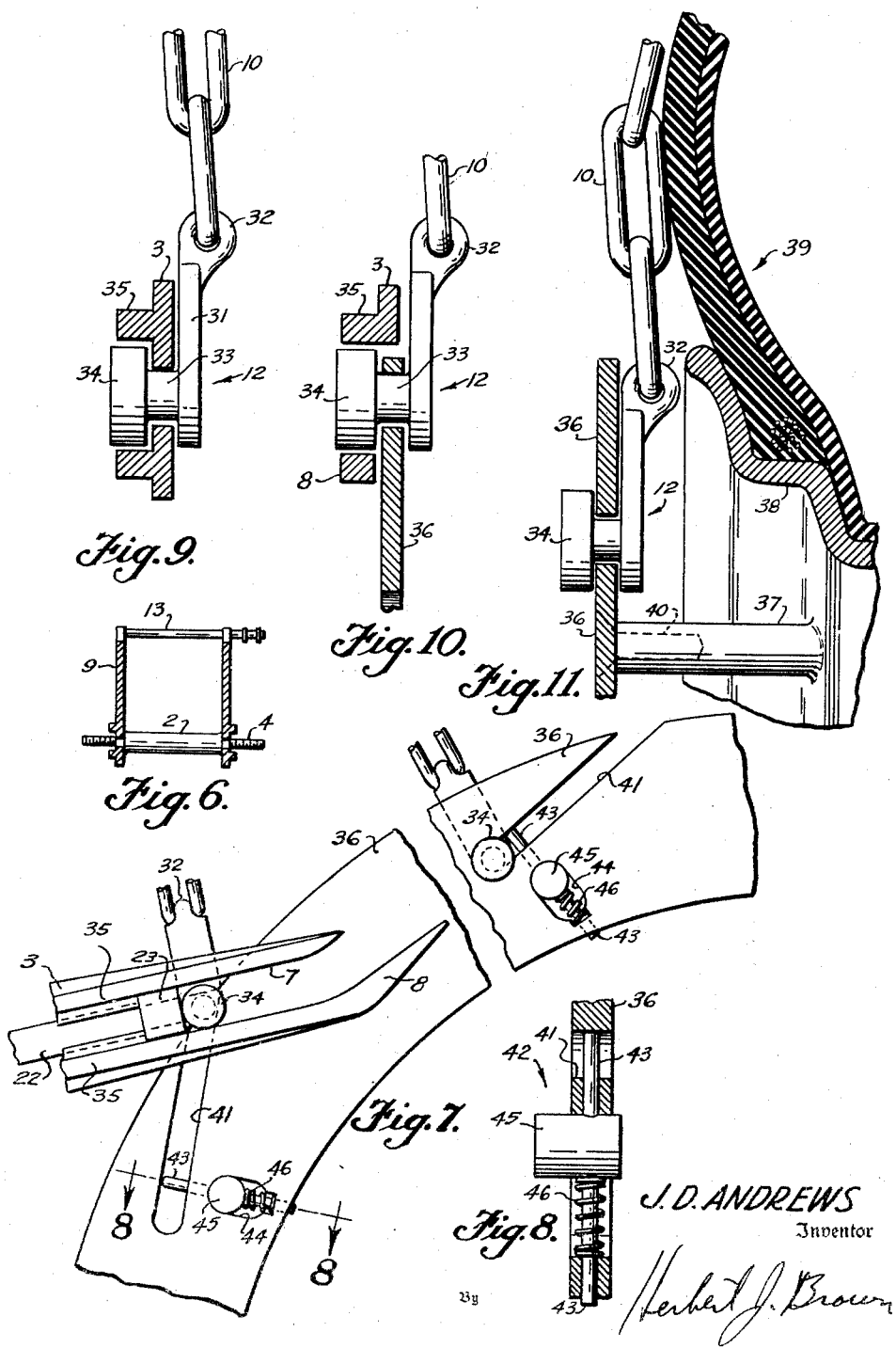
J. D. ANDREWS
Inventor Patented Sept. 4, 1951

2,566,396

UNITED STATES PATENT OFFICE 2,566,396

SKID CHAIN APPLIER AND REMOVER

James D. Andrews, Oakes, N. Dak.

Application May 26, 1949, Serial No. 95,467

5 Claims. (Cl. 152—214)

This invention relates to skid chains for vehicles, and has for its object the provision of means for applying and removing such chains while the vehicle is in motion.

A particular object of the invention is to provide a construction and arrangement whereby the driver of the vehicle may apply and remove skid chains while remaining in the driver's seat.

Another object of the invention is to provide, in combination with a device of the referred to class, an automatic locking mechanism for holding skid chains on a vehicle wheel, and which locking mechanism is operated by the chain applier and remover.

These and other objects of the invention will become apparent from the following description and the accompanying drawings, wherein:

Figure 1 is a side elevation of a portion of an automobile chassis and showing the present invention installed thereon.

Figure 2 is an enlarged elevation of the automobile wheel shown in Figure 1, and illustrating the present chain applier and remover in its operating position.

Figure 3 is a bottom plan and broken sectional view of the chain applier and remover bracket.

Figure 4 is a perspective view of the chain follower which is slidably mounted in the referred to bracket.

Figure 5 is an elevation of a slide mounted on a length of the bracket actuating cable, and which slide provides a manual means for operating the follower illustrated in Figure 4.

Figure 6 is a lateral sectional view taken on line 6—6 of Figure 2.

Figure 7 is a broken side elevation view of an annular chain holder, and showing means for transferring the chains to and from said holder.

Figure 8 is an enlarged lateral sectional view of one of the chain locks, taken on line 8—8 of Figure 7.

Figure 9 is an elevation of one of the lugs at the end of one of the skid chains, and showing the same received within one of opposing slots in the referred to bracket.

Figure 10 is a view similar to Figure 9, but showing the end of the chain engaged by both the bracket and the chain holder.

Figure 11 is a broken lateral sectional view of an automobile wheel and tire, and showing the annular chain holder mounted on the wheel rim, together with one end of one of the several skid chains engaged in the chain holder.

The form of the invention shown includes a pivoted U-shaped bracket 1 comprised of a sleeve 2 having parallel arms 3 at each end thereof. A shaft 4 mounted on the frame 5 of the vehicle by means of a support 6, is positioned through the sleeve 2 and pivotally supports the bracket 1. Opposing slots 7 are formed in the parallel arms 3, and which slots are open and upwardly turned at their outer ends, the lower projecting ends of said arms being upwardly turned, as at 8, for reasons hereinafter described.

A chain rack, in the form of parallel plates 9 projecting upwardly above the U-bracket 1 and secured to the arms 3 thereof, is provided for storing the skid chains 10 when the latter are not in use. The forward ends of the rack plates 9 include forwardly directed projections 11 so as to accommodate the lugs 12 secured to each end of the respective chains 10. The lugs 12 will be hereinafter described in detail.

The rearward upper ends of the plates 9 are secured to each other by a transverse bolt 13 to which one end of a coiled tension spring 14 is secured, and the other end of which is secured to a part of the vehicle, such as the inner surface of the rear fender 15 of the automobile.

As shown in Figure 1, a small winch 16 is secured to the steering column 17 of the vehicle and operates a cable 18 connected with the forward end of the bolt 13. As shown in Figure 3, the tension spring 14 and cable 18 are connected with the bolt 13 by means of cable terminals 19. The cable 18 is provided with guide pulleys 20 suitably supported on the vehicle, and which cable includes a tension spring 21 interposed therein for elasticity of operation.

A U-shaped follower 22 is positioned within the bracket 1 and is provided with guide elements 23 at its ends for slidably engaging the opposing edges of the respective bracket slots 7. A similar guide 24 for slidable engagement in one of the slots 7 is provided on one of the sides of the follower and is located near the closed end of the latter. A pin 25 projects laterally from the second referred to guide 24 for engaging the end of a forwardly extending cable 26 connected with a manually operated slide 27 mounted on the first described cable 18 just below the winch 16. The last described cable 26 passes over the guide pulleys 20. A tension spring 28 is interposed in the last referred to cable for elasticity of operation. Another tension spring 29 is connected between the follower pin 25 and a small bracket 30 in the supporting shaft 4.

The lugs 12, attached to each end of each of the chains 10, are respectively comprised of a back plate 31, an eyelet 32 integral with the upper end of said back plate, an annular projection 33 integral with the lower outer face of said plate, and an integral disk 34 at the outer end of said annular projection. Each eyelet 32 receives and is secured to the outer link at each end of the chain 10. Longitudinal guides 35 are formed along each side of the slots 7 in the arms 3 for accommodating and guiding the disks 34 of the lugs 12, whereas the widths of said slots accommodate the diameters of the projections 33.

As shown in Figures 7, 8, 10, and 11, there is an annular chain holder in the form of a flat ring 36 secured to projections 37 laterally extending from the rim 38 of the vehicle wheel 39. The attachment between the ring 36 and the projection 37 may be by means of countersunk screws 40, as shown in Figures 2 and 11. Slots 41 are formed in the periphery of the ring 36 and are angularly disposed with respect to tangential equally spaced locations therearound. The width of each slot 41 accommodates the annular projection 33 of the chain lugs 12. As shown in Figures 7, 9, and 10, the lower rib 35 of each arm 3 terminates at the upwardly projections 8, and whereas the latter is outwardly formed relative to the ring 36 whereby the lugs 12 may be engaged by both the bracket 1 and said ring during a phase of the operation.

Spaced from the end of each slot 41 there is a locking mechanism 42 comprised of a pin 43 slidably mounted in the ring 36 and arranged to traverse said slot. Between the inner edge of the ring 36 and each slot 41 there is an elongated opening 44 to accommodate a cylindrical projection 45 secured to the respective pin 43. A compression spring 46 is positioned around each pin 43 and between the cylindrical projection 45 and the inner end of the opening 44.

In operation, the U-shaped bracket which is normally raised from the wheel 39 by the tension spring 14 and releasing the winch 16. To apply the chains 10, the winch 16 is turned, causing the cable 18 to draw the bracket 1 downwardly to straddle the tire portion of the wheel 39. By pulling the slide 27 towards the winch 16, the cable 26 is operated causing the follower 22 to move the lugs 12 toward the open ends of the parallel slots 7. The forward movement of the vehicle and the rotation of the wheel 39 causes the projection 33 of the chain lug 12 to become engaged in the ring slot 41. By reason of the upwardly turned ends 8 of the bracket arms 3, the same are caused to contact the locking lug 45 and to move the same inwardly toward the center of the wheel 39, and thereby remove the end of the pin 43 from the slot 41. The lug 12 is then transferred to and received within the slot 41, whereas the rotation of the wheel moves said slot and chain lug away from the end of the bracket arms 3. The action of the compression spring 46 then moves the lock pin 43 outwardly to lock the lug 12 in place. The bracket 1 is held in the described down position until all of the chains 10 have been thus applied.

To remove the chains 10, the vehicle is moved backwardly, and the bracket 1 is lowered by means of the winch 16. The upwardly turned ends 8 of the bracket arms 3 contact the locking lugs 45 to remove the lock pins 43 from the slots 41. By reason of the direction of the rotation of the wheel 39, the disks 34 of the chain lugs 12 are received within the slots 7 of the bracket 1, and are successively received therein. When removing the chains 10, the slide 27 is not used, but is allowed to rest upon its stop 47 which is in the form of a clamp secured to the bracket operating cable 18. It will be noted that the tension springs 21 and 28 in the respective cables 18 and 26 provide elasticity so as to accommodate varying strains which are likely to occur during the chain applying and removing operations.

The described form of the invention may be varied within the scope of the appended claims.

What is claimed is:

1. In a skid chain applier and remover for a vehicle, the combination of a chain storage support pivotally secured to said vehicle for operation in a vertical plane and adapted to movably straddle the periphery of a wheel of said vehicle, skid chains slidably carried by said support, chain holding means carried by said wheel and including open slots therein, and projections carried by said chains for engaging said slots.

2. A skid chain applier and remover for a vehicle comprising: a U-shaped bracket pivotally secured at its closed end to said vehicle for operation in a vertical plane and adapted to movably straddle the periphery of a wheel of said vehicle, skid chains slidably carried by said bracket, chain receiving slots carried by and located on opposing sides of said wheel, and means carried at the ends of said chains for engaging said slots.

3. A skid chain applier and remover for a vehicle comprising: a U-shaped bracket pivotally secured at its closed end to said vehicle for operation in a vertical plane and adapted to movably straddle a wheel of said vehicle, skid chains slidably carried by said bracket, said chains having projections at the ends thereof, projections on each side of said wheel and having slots therein, said slots being angularly disposed with respect to the radius of said wheel and adapted to receive said projections on said chains.

4. A skid chain applier and remover for a vehicle comprising: a chain support pivotally secured to said vehicle for operation in a vertical plane and adapted to movably straddle the periphery of a wheel of said vehicle, skid chains carried by said support, chain holding means carried by said wheel and including open slots therein, projections carried by said chains for engaging said slots, and lock means carried by said chain holding means and adapted to engage and disengage said projections in said slots.

5. A skid chain applier and remover for a vehicle comprising: a U-shaped bracket having parallel arms pivotally secured at its closed end to said vehicle for operation in a vertical plane and adapted to movably straddle the periphery of a wheel of said vehicle, skid chains slidably carried by said bracket, open end slots in the parallel arms of said bracket, projections secured to the ends of said chains and slidably received within said bracket slots, chain holding means carried by opposite sides of said wheel and including open slots therein, the last said slots being angularly disposed with respect to the radius of said wheel.

JAMES D. ANDREWS.

REFERENCES CITED

The following references are of record in the file of this patent:

UNITED STATES PATENTS

| Number | Name | Date |
| --- | --- | --- |
| 2,255,178 | Machain | Sept. 9, 1941 |
| 2,351,601 | Dabbs | June 20, 1944 |